United States Patent [19]

Baron et al.

[11] Patent Number: 4,610,834

[45] Date of Patent: Sep. 9, 1986

[54] APPARATUS AND METHOD FOR INSTALLING INTERNAL ANNULAR RINGS IN TUBULAR BOX MEMBERS

[75] Inventors: Burwell E. Baron, Houston; Gary E. Kirsch, Tomball; Keith C. Mott, Houston, all of Tex.

[73] Assignee: Hydril Company, Houston, Tex.

[21] Appl. No.: 780,374

[22] Filed: Sep. 26, 1985

[51] Int. Cl.[4] ........................ B29C 65/00; B28B 11/00

[52] U.S. Cl. ........................................ 264/249; 29/451; 29/453; 29/235; 29/522 R; 29/283.5; 425/403; 425/469

[58] Field of Search ............. 29/451, 453, 235, 522 R, 29/283.5; 264/249; 425/469, 403, 445

[56] References Cited

U.S. PATENT DOCUMENTS

| | | | |
|---|---|---|---|
| 2,510,206 | 6/1950 | Barkan et al. | 29/235 X |
| 3,168,779 | 2/1965 | Schustack | 29/235 X |
| 3,180,015 | 4/1965 | Thompson et al. | 29/235 |
| 3,553,817 | 1/1971 | Lallak | 29/235 |
| 3,605,238 | 9/1971 | Escholz | 29/235 X |
| 3,639,972 | 2/1972 | Schelin et al. | 29/451 |
| 3,990,138 | 11/1976 | Bellia | 29/235 |
| 4,027,372 | 6/1977 | Mitchell | 29/235 |
| 4,091,521 | 5/1978 | Dygert | 29/451 |
| 4,141,129 | 2/1979 | Martini | 29/235 |
| 4,428,899 | 1/1984 | Manen | 264/249 |

FOREIGN PATENT DOCUMENTS 734309 4/1943 Fed. Rep. of Germany ........ 29/235

*Primary Examiner*—Charlie T. Moon
*Attorney, Agent, or Firm*—Vaden, Eickenroht, Thompson & Boulware

[57] ABSTRACT

A tool for installing a corrosion barrier ring into its groove behind the threads of a tapered box end comprises a tapered metallic liner for covering the threads and a suitable mandrel for carrying the ring to its location through the liner. A suitable seating tool may be used for the final seating of the ring in the groove. The tip is notched to permit axial deformation of the ring, but not appreciable radial deformation, so as to allow the ring to be positioned to the location of the groove. The tip of the mandrel is sized to prevent the ring from sliding over the mandrel as the mandrel is pushed through the liner. Rotating the mandrel starts the ring into the groove by straightening out the ring deformations and permits removal of the mandrel and the liner. The seating tool is then subsequently used for the final seating of the ring in its groove. Stacked tip pieces permit adjusting the contour and size of the seating tool tip to accommodate to a variety of ring shapes and sizes. When matched with the box member length, the body of the seating tool becomes a determiner for determining when the ring is properly seated.

10 Claims, 7 Drawing Figures

FIG. 1
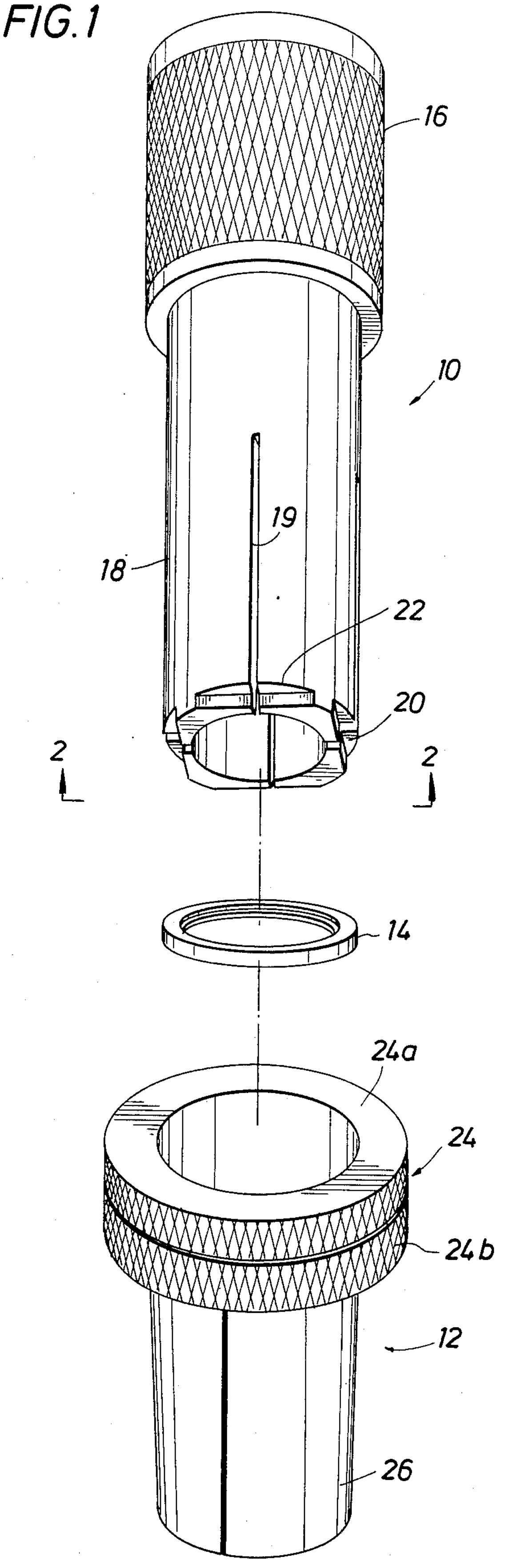
FIG. 3
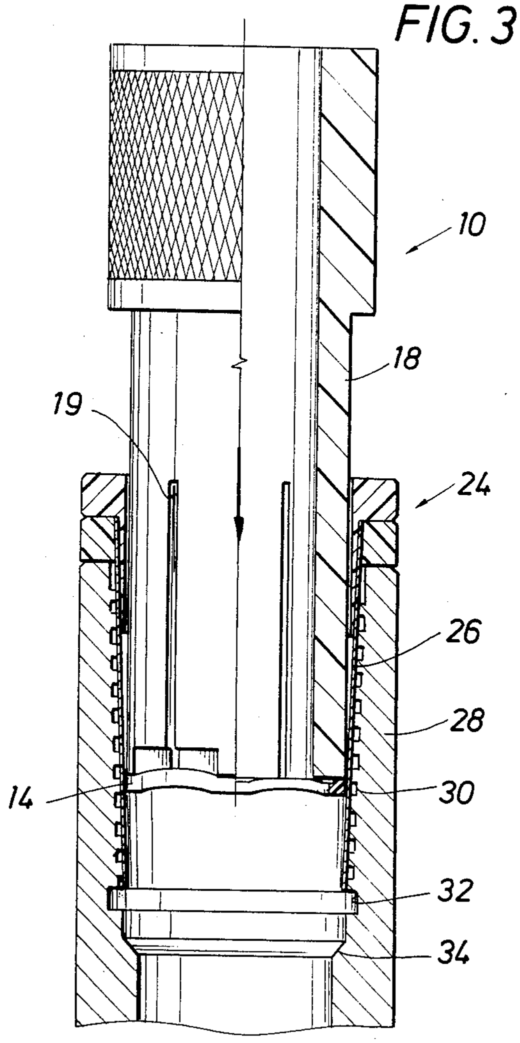
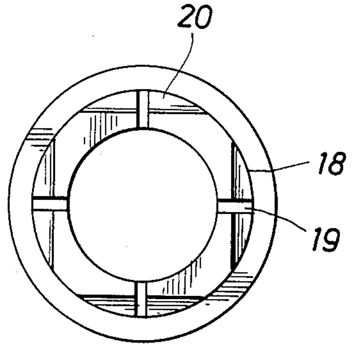
FIG. 2

FIG. 4
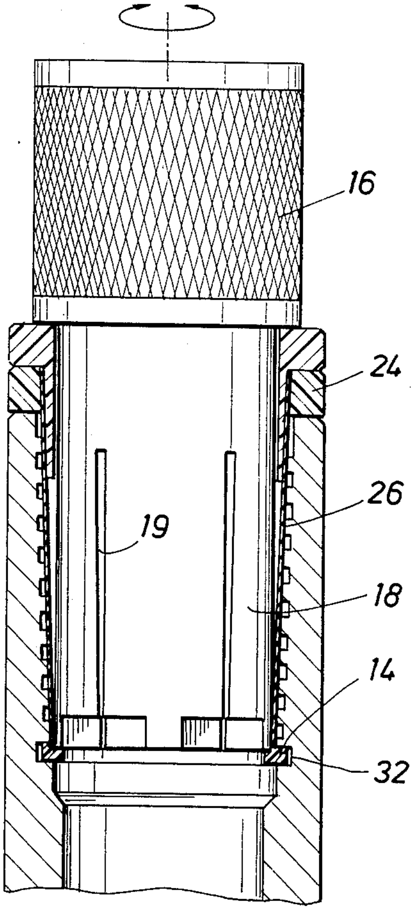
FIG. 5
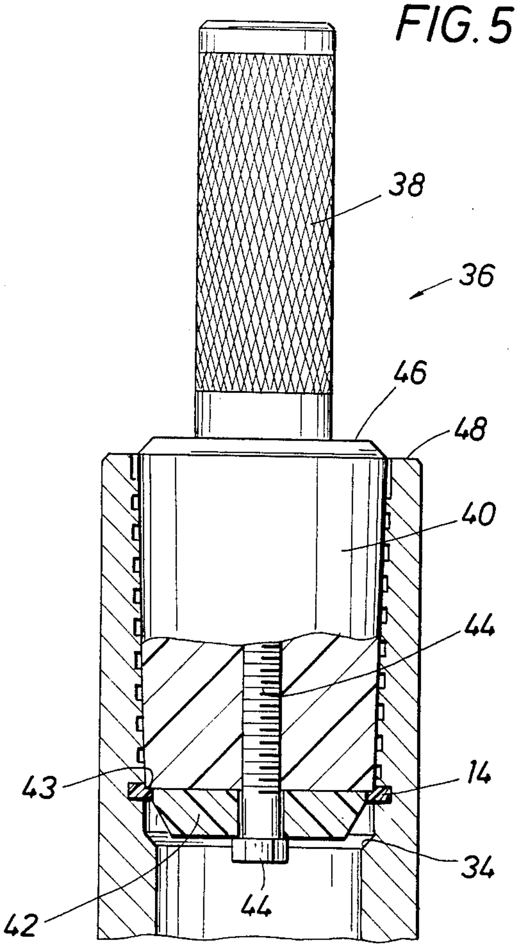
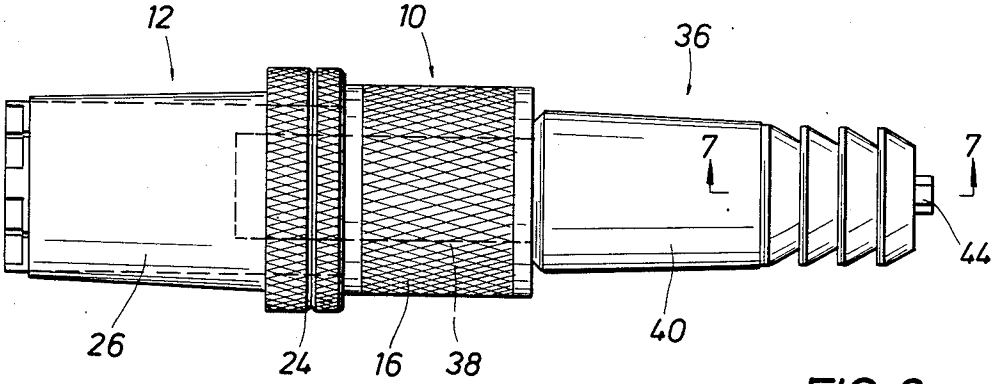
FIG. 6
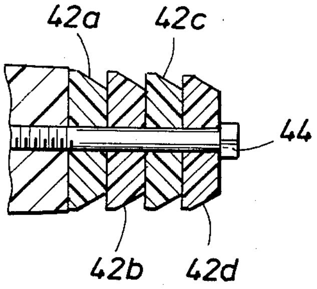
FIG. 7

APPARATUS AND METHOD FOR INSTALLING INTERNAL ANNULAR RINGS IN TUBULAR BOX MEMBERS

BACKGROUND OF THE INVENTION

1. Field of the Invention

This invention pertains to the construction of the box member of tubular goods and more specifically to the installation of a resilient ring such as a seal ring or a corrosion barrier ring within the accommodating groove of such a member.

2. Description of the Prior Art

Tubular goods used in the oil and gas industry are subjected to highly corrosive environmental and working conditions, especially such elements as $CO_2$ and $H_2S$. In addition, the products are subjected to axial load, vibrations, torque, bend and turbulence of flowing liquids and gases, often carrying erosion and corrosion producing suspended particulates. A susceptible corrosion location within a tubular string, if unprotected, will corrode and result in failure of the wall at that point. Such failure is not only inconvenient, it can be disruptively costly and even dangerous.

It is common to coat the internal diameter of tubular products. Such coating minimizes corrosion throughout the length of the pipe string. However, such coating does not form a resilient bond. Hence, when the coating is scarred, which might be caused by tightening the connection, there is created a corrosive-susceptible area.

Corrosion barrier rings have, therefore, been employed in pipe connections to provide certain advantages which cannot be obtained by coating alone. A corrosion barrier ring is located typically adjacent to a shoulder in the box end (or to a shoulder in the box-type threads of a suitable auxiliary coupling member) where the nose of the pin end abuts when the connection is made up. Such ring is typically made of a Teflon PTFE material or a fiber-filled Teflon material that cold flows on contact to form a corrosion barrier with respect to the adjacent box or box-type threads and the pin threads. Teflon is a trademark of E. I. DuPont de Nemours, Inc. for polytetrafluoroethylene (PTFE).

Tubular connecting ends can be made to be either tapered or non-tapered; however, the preference in the industry is for tapered ends. With tubular products having threads of conventional configuration where the threads are uniformly dimensioned with respect to pitch, the threads of coupled parts are screwed together until a stop shoulder is encountered or until there is a reduction in thread depth, which can also be referred to as a stop. Then, depending on how much torque is applied, the connection is made up. For example, for standard grooves with a width dimension of 0.130 inch, with normal machine tolerances applicable to drill pipe, the location of pin-end-nose to box-end-shoulder can be reliably located within ±0.020 inches. A suitable recess concentric with the internal annulus at the rear of the box-type threads provides a space for a corrosion barrier ring. The location of such space is very predictable since the location of the stop just described, is closely controlled.

The placement of the corrosion barrier rings into their accommodating grooves, particularly on a production basis, has heretofore been time consuming and an expensive hand-manipulation step. To manipulate such rings is dexterously difficult and can cause injury to the fingers of the persons who do the installing. Such rings are deformable, but have poor plastic memories. Therefore, if a radial deformation is made in the ring to make it small enough to pass through the thread area to the vicinity of the groove, it must be physically forced outwardly into conformity with the groove. Working with the threads and sometimes spreading fingers over the edge or rim of the box member is potentially injurious and painful to the fingers and the webbing between the fingers. Moreover, there is no certainty that the ring is well seated in the groove, which is vital to accomplish its corrosion barrier purpose. About the only way heretofore to test if the ring is in place is to make up the joint by screwing a pin end in place. This, again, is time consuming and there is still no certainty or way of checking that the ring is properly seated in its groove since these parts are hidden from view when the connection is made up. In addition, corrosion barrier rings are not normally reusable. They permanently deform to accommodate to a particular connection configuration. A test makeup could damage or distort the ring for a subsequent in-use makeup. If damaged, then the removal of the ring is yet another time-consuming step.

Therefore, it is a feature of the present invention to provide an improved method of installing a corrosion barrier ring into the box member of a pipe without requiring hand manipulation and which assures that the ring is neither distorted nor improperly seated.

It is another feature of the present invention to provide an improved tool or apparatus for manipulating a corrosion barrier ring so as to ensure its proper seating in the accommodating groove behind the threaded area of a tubular box member end.

SUMMARY OF THE INVENTION

The box member of a tubular product which includes a tapered threaded area includes an annular groove behind the tapered area for receiving a suitable annular corrosion barrier ring. Such a barrier ring is deformable, but has a poor plastic memory and, therefore, is not highly flexible. The inventive installation procedure utilizes a metallic, frusto-conical guide sleeve liner that fits into the box member and protectably covers the threads but not the groove and, thus, provides a smooth surface for the corrosion barrier ring to slide along. The taper on the liner is the same as on the threads.

Next, a cylindrical mandrel or plugging tool is employed having an annular tip which has a diameter only slightly smaller than the entrance to the ring groove. The tip is notched to permit axial deformation of the ring to be installed, which ring is placed to ride on the tip. The mandrel permits only slight radial deformation of the ring. The non-notched portion of the mandrel tip is sufficiently large that the ring placed to ride on the tip cannot ride or slip over the outside of the mandrel. The ring is placed on the tip and the mandrel is inserted through the liner until the ring is opposite the ring groove. As the mandrel is pushed through the liner, the ring radially deforms in a controlled manner into the tip notches. The mandrel is also slotted to allow it to slightly compress during the insertion procedure. The mandrel is then turned so that the holding friction of the ring entering the groove prevents the ring from also turning. Hence, as the non-notched tip portions encounter the radially deformed portion of the ring, these deformations are largely straightened out and the ring is left in the groove, although not necessarily completely seated. This is because of the slight ring deformations that may still exist as well as the fact that the ring may be sized so that it is slightly smaller in either or both radial and lateral dimension than the groove. The mandrel is then removed.

Finally, a tapered seating tool is used having a beveled tip and a tapered body. This tool is dimensioned to pass through the end of the box member after the removal of the liner. The length of the body of the seating tool is coordinated with the length of the threaded area of the box member. The tool is pushed through the box member so as to press the ring snugly into the groove and to slightly expand it radially, if necessary. When the ring is properly seated, the body of the compression tool is flush with the box member end.

The seating tool preferably includes a plurality of interchangeable tip pieces or tip cones that permits the selection of the proper tip end for any of a variety of ring sizes and shapes of their accommodating grooves. The tip pieces are stacked for transport and storage via center holes through the pieces and a tapped threaded hole in the tool body. A suitable holding bolt is inserted through the tip pieces and screwed into the body hole. Depending on the subject ring and groove, particularly, the radial and axial thickness dimensions of the ring, the specific tip piece is chosen for a particular installation.

BRIEF DESCRIPTION OF THE DRAWINGS

So that the manner in which the above-received features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope as the invention may admit to other equally effective embodiments.

In the Drawings:

FIG. 1 is a pictorial, exploded view of a suitable mandrel and sleeve liner in accordance with the present invention showing an annular corrosion barrier ring therewith.

FIG. 2 is an end view of the mandrel taken at line 2—2 of FIG. 1.

FIG. 3 is a cross-sectional view of the mandrel and sleeve liner shown in FIG. 1 as it inserts the corrosion barrier ring into suitable box-type threads of a tubular product.

FIG. 4 is a cross-sectional view of the seated corrosion barrier ring following full insertion of the mandrel through the sleeve in accordance with the present invention;

FIG. 5 is a cross-sectional view of the seating tool in position for final seating placement of the corrosion barrier ring in the box-type threads of the tubular product.

FIG. 6 is a side view of the three parts of the installation apparatus in accordance with the present invention.

FIG. 7 is a cross-sectional view taken at line 7—7 in FIG. 6.

DESCRIPTION OF THE PREFERRED EMBODIMENTS

Now referring to the drawings, and first to FIG. 1, an exploded view of a suitable cylindrical mandrel or plugging tool 10 is shown together with a metallic, frustoconical guide sleeve liner tool 12. A corrosion barrier ring 14 which is to be installed by the apparatus is shown prior to being installed. Normally, the cross-section of a corrosion barrier ring is L-shaped; however, this invention is not limited to the cross-sectional appearance of such ring, which may be otherwise shaped. Referring to mandrel 10, the apparatus is a one-piece unit preferably made of plastic, hard rubber, or the like and generally comprises an enlarged handle end 16 and a circumferentially smaller insertion end 18. Handle end 16 can be knurled for the convenience of the user.

The tip of the insertion end of the mandrel is notched at four quadrant locations 20 regularly located around the periphery of the tip to a depth which is approximately the same as the thickness of the corrosion barrier ring to be inserted. The depth could be slightly less or slightly greater than such thickness. In any event, the unnotched portion of the end of the mandrel has an outside diameter only slightly smaller than the inside diameter of the entrance of groove 32, discussed below. The circumference of the insertion end of the mandrel at a location 22 that is at the deepest part of notches 20 is dimensionally approximately the same as the circumference of corrosion barrier ring 14 so that the barrier ring cannot be pushed axially past location 22. As is noted, however, the ring can be axially and slightly radially deformed so as to fit into each of the notches 20 as the mandrel pushes the ring into position, as described later. Elongate slits 19 in insertion end 18 that respectively open into each of notches 20 provide inward flexing of end 18.

Referring to metallic guide sleeve liner tool 12, this tool also is in two main parts, an upper part or handle 24 and a lower sleeve liner 26. Handle 24 is ring-like and conveniently separates in two sub-parts. It is preferably made of plastic, hard rubber, or the like similar to mandrel 10 just described. It can also be metallic, if desired. The sleeve liner portion of the tool is a metallic sheet that is wrapped around an extension on top sub-part or stationary ring 24*a* of handle 24 and held firmly in position by lower sub-part or holding ring 24*b* which rides up over the extension and circular sheet to hold the sheet in place. The metallic sheet is preferably, 0.010 inch brass shim stock and is readily replaceable if it becomes damaged. Thus, the guide sleeve liner tool is made from three parts. In summary, the overall tool comprises a handle 24 comprising sub-parts 24*a* and 24*b* and the lower sleeve liner 26. Both sub-parts 24*a* and 24*b* can be knurled for convenience and appear as a single handle unit. The sheet is slightly tapered in an amount equal to the taper of the internal or box threads of the tubular product into which the corrosion barrier ring is to be inserted. The axial length of sleeve liner 26 is equal to the length of the box threads.

Now referring to FIG. 3, mandrel 10 and guide sleeve liner tool 12 just described are shown being used for inserting a corrosion barrier ring in accordance with the present invention into box end 28 of a tubular product. This tubular product can be either the box end of a joint or length of pipe or other tubing tool with such a connecting end or one of the box ends of a coupling connection used for joining together two contiguous pin ends of tubular products. The threaded area of the box end is slightly tapered in conventional fashion and includes threads 30. At a location in the box end that is slightly deeper than the threads, there is a corrosion barrier ring groove 32. Ring groove 32 is located between the last thread of the box end and stop shoulder 34.

In placing the ring in position, the sleeve liner tool is first placed into the box end so that sleeve liner 26 covers and protects the threads. Handle 24 abuts the edge of the box end, thereby limiting the axial location of tool 12. As mentioned above, the extended sleeve liner covers the threads but leaves groove 32 internally exposed.

Corrosion barrier ring 14 is placed in a position so that it rides on the tip of mandrel 10 as it is inserted axially into the sleeve liner tool previously placed in the box end. This may be done by first depositing the ring within the liner. It will only go in a short distance. The mandrel is then started into the liner and engages the ring. It is then pushed forward with ring 14 riding on its tip. It will be seen that the ring radially and axially deforms slightly as permitted by notches 20 of the tip during the process of the ring being pushed through the sleeve liner. It may be also noted that elongated slits 19 in the extension end of the mandrel permits slight flexing inwardly of the mandrel as it is inserted to its deepest position within the box end.

Now referring to FIG. 4, insertion end 18 of the mandrel is shown in its deepest position within the box end. At this location, corrosion barrier ring 14 is at least partially within accommodating groove 32. Handle 16 of the mandrel abuts handle 24 of sleeve liner tool 12. The mandrel is then rotated in either a clockwise or a counterclockwise direction to release the corrosion barrier from the tip of the tool. This occurs because there is sufficient friction between corrosion barrier ring 14 and groove 32 to keep the ring from rotating with the tip as it is turned. Rotation of the tip brings the non-notched portions of the tip opposite the axial and radial deformations of the ring, thereby causing these deformations to straighten, at least slightly. At the same time, the ring is radially pressed outwardly into the accommodating groove. The liner and insertion mandrel are then removed.

Because the ring is not fully seated in its location, a third tool as shown in FIG. 5, is desirably inserted to assure this final seating. Seating tool 36 is made of a suitable hard plastic, hard rubber or the like and includes a handle 38 and an enlarged, tapered body 40. Handle 38 can be knurled for handling convenience. A suitable tip piece 42 is held on to the end of body 40 by a suitable bolt 44. Bolt 44 operates through a central opening in tip piece 42 slightly larger than the bolt dimension. Body 40 is suitably drilled and tapped to receive bolt 44.

Tip piece 42 is tapered at its outward end and, hence, is cone-like in appearance. It is properly dimensioned so that when it is pressed past corrosion barrier ring 14 as seating tool 36 is advanced into the box end, the contoured shape of the tip piece causes ring 14 to radially expand and seat in its final position within accommodating groove 32. FIG. 5 shows the seating tool just prior to being completely advanced to its final axial position. Body 40 is stopped when tip piece 42 passes through the interal diameter of ring 14, pressing it radially outwardly, and resulting in forward edge or shoulder 43 of body 40 just behind tip piece 42 to come to rest on the L-shape leg of ring 14. A slight pressing or tamping of the tool by hand is usually necessary to cause the ring to snap into its final seated position. However, a hammer or the like should not be used to strike a hard blow. If the ring cannot be seated by hand, then the ring is not properly aligned and the ring must be restarted, as described above. The operator notes that the seating tool has been properly stopped and the ring is seated when top part 46 of body 40 of the tool is exactly even with edge 48 of the box end.

It is convenient to store mandrel 10, guide sleeve liner tool 12 and seating tool 36 together into one unit as shown in FIG. 6 when the tools are not being used. This is done by making handle 38 slightly circumferentially smaller than an annular opening in handle 16 of mandrel 10. Mandrel 10 and guide sleeve liner tool 12 are already designed to fit together, as discussed above.

Now referring to FIG. 7 a cross-sectional view of the tip assembly of seating tool 36 is illustrated. In FIG. 7, a plurality of tip pieces 42*a*, 42*b*, 42*c*, and 42*d* are shown in stacked alignment, all held by bolt 44 into an accommodating hole in the center of body 40 of tool 36. These tips all have different end contours from one another, such as differing in dimension and/or slope of their tapered edges. Such differences are determined by the variety of expected ring and groove sizes to be encountered. Rings vary in both radial and lateral thickness dimension and even shape. The seating tool desirably is made universal enough to permit its use by having a plurality of different tip pieces which are selectably interchangeable so that the end of the tool can employ the right tip piece for any particular job. The tip pieces not employed for a particular installation procedure are set aside, to be restored to the stack during subsequent storage.

While particular embodiments of the invention have been shown and described, it will be understood that the invention is not limited thereto since modifications may be made and will become apparent to those skilled in the art. For example, the seating tool may not be deemed necessary in all cases. When the box end with the ring nearly seated by the operation of the mandrel is made up with a pin end, the ring will normally completely seat without difficulty. However, seating tool use in the manner described assures complete seating of the ring beforehand. This protects against the ring falling out during shipping or handling and prior to makeup.

Further, it has been assumed in the above description that the groove for the ring to be installed was located behind the deepest thread in the box end of the tubular product. In some cases, the groove is located within the threads. In such case, the length of the liner is determined to be sufficiently long to cover only those threads in front of the groove. Otherwise, the apparatus and the operation of the apparatus for seating a ring in such groove is substantially the same as the description set forth above.

What is claimed is:

1. The method of inserting and seating a corrosion barrier ring having poor plastic memory into a threaded tapered tubular box member having a groove behind its last thread for receiving the corrosion barrier ring, which comprises the steps of inserting a frusto-conical metallic guide sheet liner into said box member having at least approximately the same longitudinal taper as the box member to cover the thread area while leaving the corrosion barrier groove uncovered, inserting the corrosion barrier ring through said metallic sheet liner to align the corrosion barrier ring opposite the corrosion barrier groove using a mandrel, that has an end with spaced peripheral notches therein that inhibits excessive radial deformation of the corrosion barrier ring while permitting axial and radial deformation of the corrosion barrier ring into said notches, the unnotched end of the mandrel being approximately the same diameter dimension as the corrosion barrier ring so that the corrosion barrier ring does not slip over the end of said mandrel, the unnotched portion of the end of said mandrel having an outside diameter only slightly smaller than the inside diameter of the entrance of the corrosion barrier groove, and rotating the mandrel to force the corrosion barrier ring into the corrosion barrier groove by straightening of the axial and radial deformations in the corrosion barrier ring as the mandrel is rotated and the unnotched end of the mandrel is rotated past the axial deformations.

2. The method in accordance with claim 1, and including the step of inserting an elongate annular seating tool having a beveled tip through said metallic sheet liner and tamping said corrosion barrier ring into final seating relationship within said corrosion barrier groove.

3. The method in accordance with claim 1, wherein the corrosion barrier ring is inserted through said metallic sheet liner with a slotted mandrel that radially flexes slightly inwardly when the corrosion barrier ring is aligned opposite the corrosion barrier groove and the mandrel is turned.

4. Apparatus for inserting and seating a corrosion barrier corrosion barrier ring having poor plastic memory into a threaded, tapered tubular box member having a groove behind its last thread for receiving the corrosion barrier ring, comprising a frusto-conically shaped metallic guide liner having a longitudinal taper approximately the same as the taper of the threaded box member and a length which is sufficient to cover the threads of the box member without covering the corrosion barrier groove, and an elongate, annular mandrel longer than said liner length having an end with spaced peripheral notches therein that permits axial and radial deformation of the corrosion barrier ring while inhibiting excessive radially deformation of the corrosion barrier ring, the unnotched end of the mandrel being approximately the same diameter dimension as the corrosion barrier ring so that the corrosion barrier ring does not slip over the end of said mandrel whereby rotating the mandrel forces the corrosion barrier ring into the corrosion barrier groove by straightening of the axial and radial deformations in the corrosion barrier ring as the mandrel is rotated and the unotched end of the mandrel is rotated past the axial deformations.

5. Apparatus in accordance with claim 4, wherein said mandrel includes at least one elongate slot to permit radial flexing.

6. Apparatus in accordance with claim 4, wherein said notched end portion of said mandrel includes four notches evenly spaced around the end of said mandrel.

7. Apparatus in accordance with claim 4, and including an annular seating tool longer than said metallic liner and having an outside diameter to permit passage therethrough, and having a beveled tip for pressing the corrosion barrier ring into its final seating relationship within the corrosion barrier groove.

8. Apparatus in accordance with claim 7, wherein said annular seating tool has a main body length including its tip equal to the length of the threaded box member so that when the corrosion barrier ring is fully seated within the corrosion barrier groove, said main body of said annular seating tool is flush with the end of the box member.

9. Apparatus in accordance with claim 8, and having a tip piece selectable from a plurality of tip pieces for inclusion on the end of said annular seating tool for interchangeably adjusting the tip piece of said tool for different sizes of corrosion barrier rings.

10. Apparatus in accordance with claim 9, wherein said tip pieces each have a center hole, said main body behind the tip having a threadedly tapped center hole, and including a bolt for securing said tips in stacked relationship onto the seating tool by screwing said bolt into said threadedly tapped center hole.

* * * * *